(12) United States Patent
Ross

(10) Patent No.: US 12,080,970 B2
(45) Date of Patent: Sep. 3, 2024

(54) CONFIGURABLE IOT APPARATUS AND SYSTEM FOR COMMUNICATING WITH PLUGIN CARDS

(71) Applicant: CACI, Inc.—Federal, Arlington, VA (US)

(72) Inventor: Michael Ray Ross, Westminster, CO (US)

(73) Assignee: CACI, Inc.—Federal, Reston, VA (US)

(*) Notice: Subject to any disclaimer, the term of this patent is extended or adjusted under 35 U.S.C. 154(b) by 325 days.

(21) Appl. No.: 17/325,423

(22) Filed: May 20, 2021

(65) Prior Publication Data
US 2022/0200192 A1 Jun. 23, 2022

Related U.S. Application Data

(60) Provisional application No. 63/130,034, filed on Dec. 23, 2020.

(51) Int. Cl.
*H01R 12/00* (2006.01)
*G06F 9/4401* (2018.01)
(Continued)

(52) U.S. Cl.
CPC ......... *H01R 13/518* (2013.01); *G06F 9/4403* (2013.01); *H01R 12/727* (2013.01);
(Continued)

(58) Field of Classification Search
CPC .... H01R 12/727; H01R 12/722; H01R 12/72; H01R 13/518; H01R 13/512;
(Continued)

(56) References Cited

U.S. PATENT DOCUMENTS 5,388,995 A * 2/1995 Rudy, Jr. ............ H01R 13/6596
361/730
7,352,573 B2 4/2008 Wong
(Continued)

OTHER PUBLICATIONS

AoC3U-410, 2021, LCR Embedded Systems, site visited Feb. 14, 2023: https://www.lcrembeddedsystems.com/aoc3u-410-chassis/#tab-5 (Year: 2021).
(Continued)

*Primary Examiner* — Khiem M Nguyen
(74) *Attorney, Agent, or Firm* — BakerHostetler

(57) ABSTRACT

A card connector that is removably fixable to a main body of a carrier system. For example, an outer flange of the card connector may be removably fixed (e.g., with fasteners, such as bolts) to the main body of the carrier system. A protrusion of the card connector may include a connector configured to electrically couple to the plugin card. The protrusion may extend into an interior of the main body when the card connector is removably fixed to the main body, such that the plugin card is disposed entirely within the main body. The card connector provides for a user to easily remove the card connector from the main body (e.g. by unfastening bolts and sliding the card connector out of the main body) and removably fix a new card connector to the main body. The new card connector may include different internal electronics or external porting than the original card connector.

20 Claims, 13 Drawing Sheets

(51) Int. Cl.
- *H01R 12/72* (2011.01)
- *H01R 13/512* (2006.01)
- *H01R 13/518* (2006.01)
- *H05K 7/14* (2006.01)
- *H05K 7/20* (2006.01)
- *G06N 3/02* (2006.01)
- *G06N 20/00* (2019.01)

(52) U.S. Cl.
CPC ......... *H01R 13/512* (2013.01); *H05K 7/1438* (2013.01); *H05K 7/20172* (2013.01); *G06F 9/4413* (2013.01); *G06N 3/02* (2013.01); *G06N 20/00* (2019.01); *H01R 2201/26* (2013.01)

(58) Field of Classification Search
CPC . H01R 2201/26; G06F 9/4403; G06F 9/4413; H05K 7/1438; H05K 7/20172; G06N 20/00; G06N 3/02
USPC ....................................................... 439/76.1
See application file for complete search history.

(56) References Cited

U.S. PATENT DOCUMENTS

| | | | |
|---|---|---|---|
| 9,326,401 | B2 | 4/2016 | Duran et al. |
| 10,143,093 | B2 | 11/2018 | Kim et al. |
| 10,238,004 | B2 | 3/2019 | Baran et al. |
| 10,250,954 | B2 | 4/2019 | Christie et al. |
| 10,306,793 | B2 | 5/2019 | Coenegracht et al. |
| 10,361,546 | B2 | 7/2019 | Madathil et al. |
| 10,953,825 | B2 | 3/2021 | Sanvito et al. |
| 10,992,115 | B2 | 4/2021 | Yin |
| 11,503,741 | B2 | 11/2022 | Kandori et al. |
| 11,515,088 | B2 | 11/2022 | Kanayama et al. |
| 2004/0218374 | A1* | 11/2004 | Doyle ................. G02B 6/4452 361/796 |
| 2017/0250493 | A1 | 8/2017 | Iijima et al. |

OTHER PUBLICATIONS

Silver Palm Tuner, unknown date, Curtiss-Wright, site visited Feb. 13, 2023: https://www.curtisswrightds.com/products/computing-systems/program-specific/electronic-warfare-system-sp (Year: 2023).

* cited by examiner

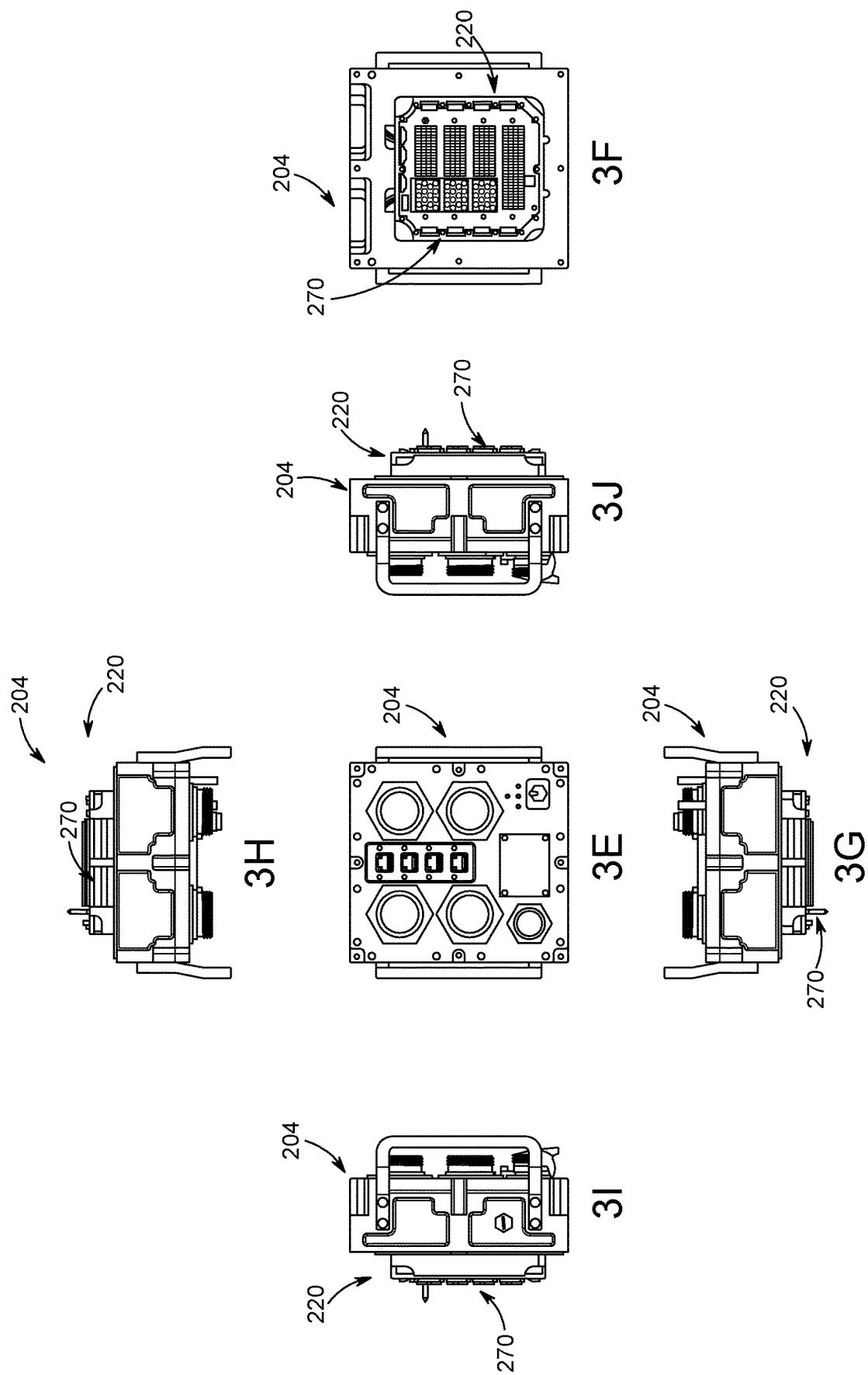
Figure 3E-J

CONFIGURABLE IOT APPARATUS AND SYSTEM FOR COMMUNICATING WITH PLUGIN CARDS

CROSS REFERENCE TO RELATED APPLICATIONS

This application claims the benefit of U.S. Provisional Patent App. No. 63/130,034, filed Dec. 23, 2020, the entire disclosure of which is hereby incorporated by reference as if set forth in its entirety herein. This application further incorporates by reference herein the same-day-filed applications, titled "Systems, Apparatuses, and Methods for Predicting a State of a Card Connector," and "Process and System for Managing Carrier Systems,".

FIELD

This application is generally related to a configurable card connector apparatus and system for communicating with plugin cards.

BACKGROUND

Generally, interchangeable card systems are fixed at the time of manufacture. Stated differently, the system once delivered to a customer cannot be changed, configured, and/or upgraded. To do so requires returning the system to the manufacturer or procuring a new unit.

Both options have drawbacks. Returning the system results in downtime of operations negatively affecting productivity. Procuring a new unit increases capital expenditures affecting profits.

What is desired in the art is a configurable card connector apparatus and system allowing quick and relatively inexpensive upgrades or repairs to a carrier system.

SUMMARY

The present disclosure provides a card connector that is removably fixable to a main body of a carrier system. For example, an outer flange of the card connector may be removably fixed (e.g., with fasteners, such as bolts) to the main body of the carrier system. A protrusion of the card connector may include a card connecting plane (e.g., a backplane) that has a connector configured to electrically couple to the plugin card. The protrusion may extend into an interior of the main body when the card connector is removably fixed to the main body, such that the plugin card is disposed entirely within the main body. The card connector provides for a user to easily remove the card connector from the main body (e.g. by unfastening bolts and sliding the card connector out of the main body) and removably affix a new card connector to the main body. The new card connector may include different internal electronics or external porting than the original card connector.

Accordingly, the card connector may provide for the foregoing needs to be met, to a great extent, by the disclosed apparatus, system and method for making and using the card connector.

One aspect of the application is directed to a configurable card connector. The configurable card connector includes a first end and a second end. The first end of the card connector is configured to connect with one or more plugin cards housed in a carrier system. The first end of the card connector is configured to be removably fixed to a card connecting plane of a carrier system. The second end of the card connector includes one or more ports for communicating with electrical equipment. The second end of the card connector is configured to be exposed to the environment upon deployment. In some embodiments, the second end of the card connector is configured to function as an external face of the carrier system.

According to another aspect, the carrier system includes a main body configured to house a plugin card. Carrier system may include a card connector including a first end with a connector configured to electrically couple to the plugin card, and include a second end with at least one port that is configured to electrically communicate with the connector, where the first end is removably fixable to the main body in a position in which the first end faces the main body. The first end may be configured to be removed from the main body when the first end is removably fixed to the main body. Other embodiments of this aspect include corresponding computer systems, apparatus, and computer programs recorded on one or more computer storage devices, each configured to perform the actions of the methods.

According to another aspect, the card connector includes a first end with a connector configured to electrically couple to a plugin card. The card connector may include a second end with at least one port that is configured to electrically communicate with the connector. The first end may include a fastener configured to removably fix the first end to a main body in a position in which the first end faces the main body. The first end may be configured to be removed by a user from the main body when the first end is removably fixed to the main body. Other embodiments of this aspect include corresponding computer systems, apparatus, and computer programs recorded on one or more computer storage devices, each configured to perform the actions of the methods.

According to another aspect, a method of connecting a card connector to a main body of a carrier. The method may include removably fixing a first end of the card connector to the main body, where the first end includes a connector configured to electrically couple to a plugin card. The method may include removing the first end of the card connector from the main body. Other embodiments of this aspect include corresponding computer systems, apparatus, and computer programs recorded on one or more computer storage devices, each configured to perform the actions of the methods.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

FIG. 3E illustrates a front view of the card connector of FIG. 3A.

FIG. 3F illustrates a rear view of the card connector of FIG. 3A.

FIG. 3G illustrates a bottom view of the card connector of FIG. 3A.

FIG. 3H illustrates a top view of the card connector of FIG. 3A.

FIG. 3I illustrates a side view of the card connector of FIG. 3A.

FIG. 3J illustrates another side view of the card connector of FIG. 3A.

DETAILED DESCRIPTION

Figure 1A:
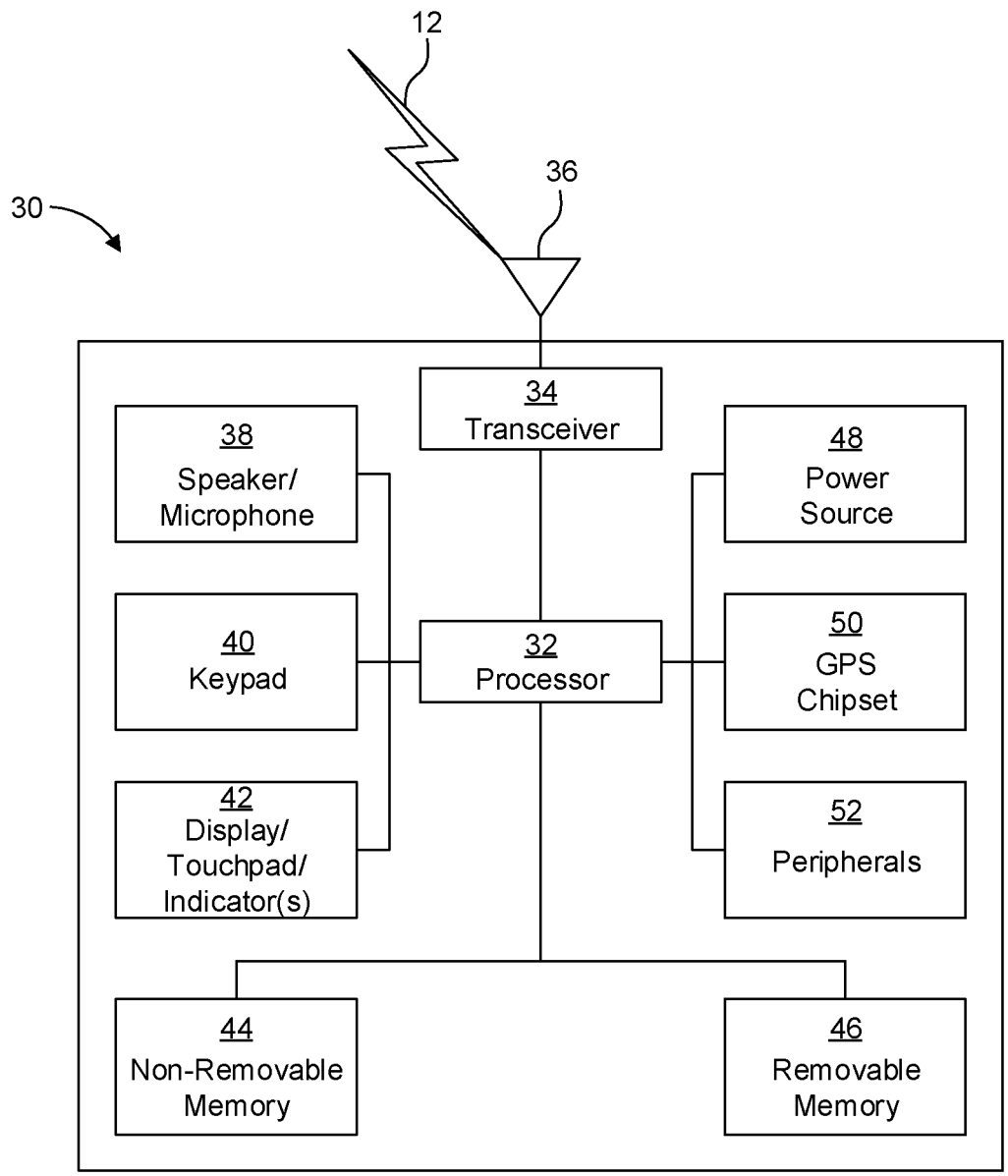
FIG. 1A illustrates an exemplary hardware/software architecture according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

The present application discloses a card connector that may have enhanced connectivity and configurable options for external connection to plugin cards. For example, the card connector can increase the number of coax connections from less than, 8 to 10, 12, 14, 20 or more. Additionally, the card connector may be configurable to increase the number of fiber connections.

Computer Architecture

FIG. 1A is a block diagram of an exemplary hardware/software architecture of a node 30 of a network, which may operate as a server, gateway, device, or other node in a network. In an exemplary embodiment, the node is a configurable card connector with software functionality to communicate with one or more other nodes in the network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52, including but not limited to an accelerometer. The node 30 may also include communication circuitry, such as a transceiver 34 and a transmit/receive element 36. In an embodiment, the node includes a camera element separate from the peripherals. In some embodiments, the node includes a battery separate from the power source for low power mode and/or battery back-up mode for to preserve at least some functionality of the node such as powering a real-time clock (RTC), GPS, and/or volatile memory (in some embodiments, RAM). The battery may power portions of the node, but not every portion of the node that requires power to function. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-network (RAN) layer programs and/or other communications programs. The processor 32 may also perform security operations, such as authentication, security key agreement, and/or cryptographic operations. The security operations may be performed, for example, at the access layer and/or application layer.

Figure 1B:
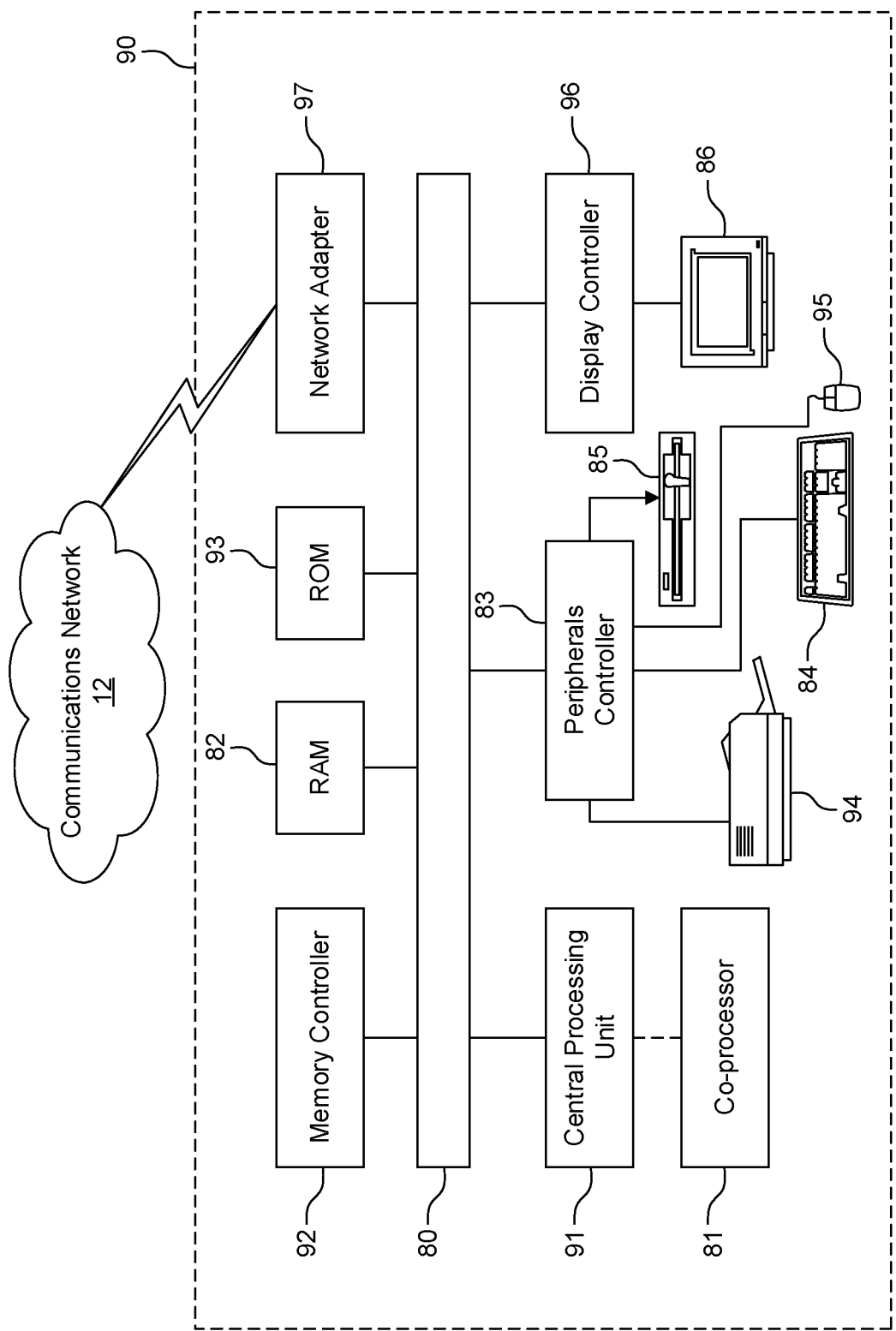
FIG. 1B illustrates an exemplary computing system according to an aspect of the application.

As shown in FIG. 1A, the processor 32 is coupled to its communication circuitry (e.g., transceiver 34 and transmit/receive element 36 (e.g., another transceiver)). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including servers, gateways, wireless devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless signals, wired signals, and/or optical signals.

In addition, although the transmit/receive element 36 is depicted in FIG. 1A as a single element, the node 30 may include any number of transmit/receive elements 36. More specifically, the node 30 may employ multiple-input and multiple-output (MIMO) technology, single-input multiple-output (SIMO) technology, and/or multiple-input single-output (MISO) technology. Thus, in an embodiment, the node 30 may include two or more transmit/receive elements 36 (e.g., multiple antennas) for transmitting and receiving wireless signals.

The transceiver 34 may be configured to modulate the signals to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs (Radio Access Technology), such as Universal Terrestrial Radio Access (UTRA) and IEEE 802.11, for example.

The processor 32 may access information from, and store data in, any type of suitable memory, such as the non-removable memory 44 and/or the removable memory 46. For example, the processor 32 may store data analytics associated with repairs, upgrades or tamper detection in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude, latitude, and altitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, an Internet browser, and the like.

The node 30 may be embodied in other apparatuses or devices. The node 30 may connect to other components, modules, or systems of such apparatuses or devices via one or more interconnect interfaces, such as an interconnect interface that may comprise one of the peripherals 52.

FIG. 1B is a block diagram of an exemplary computing system 90 that may be used to implement one or more nodes of a network, and which may operate as a server, gateway, device, or other node in a network. The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such memories include circuitry that allows information to be stored and retrieved. The ROM 93 generally contains stored data that cannot easily be modified and may be non-volatile without power. Data stored in the RAM 82 may be read or changed by the CPU 91 or other hardware devices and may be volatile without power. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Figure 1C:
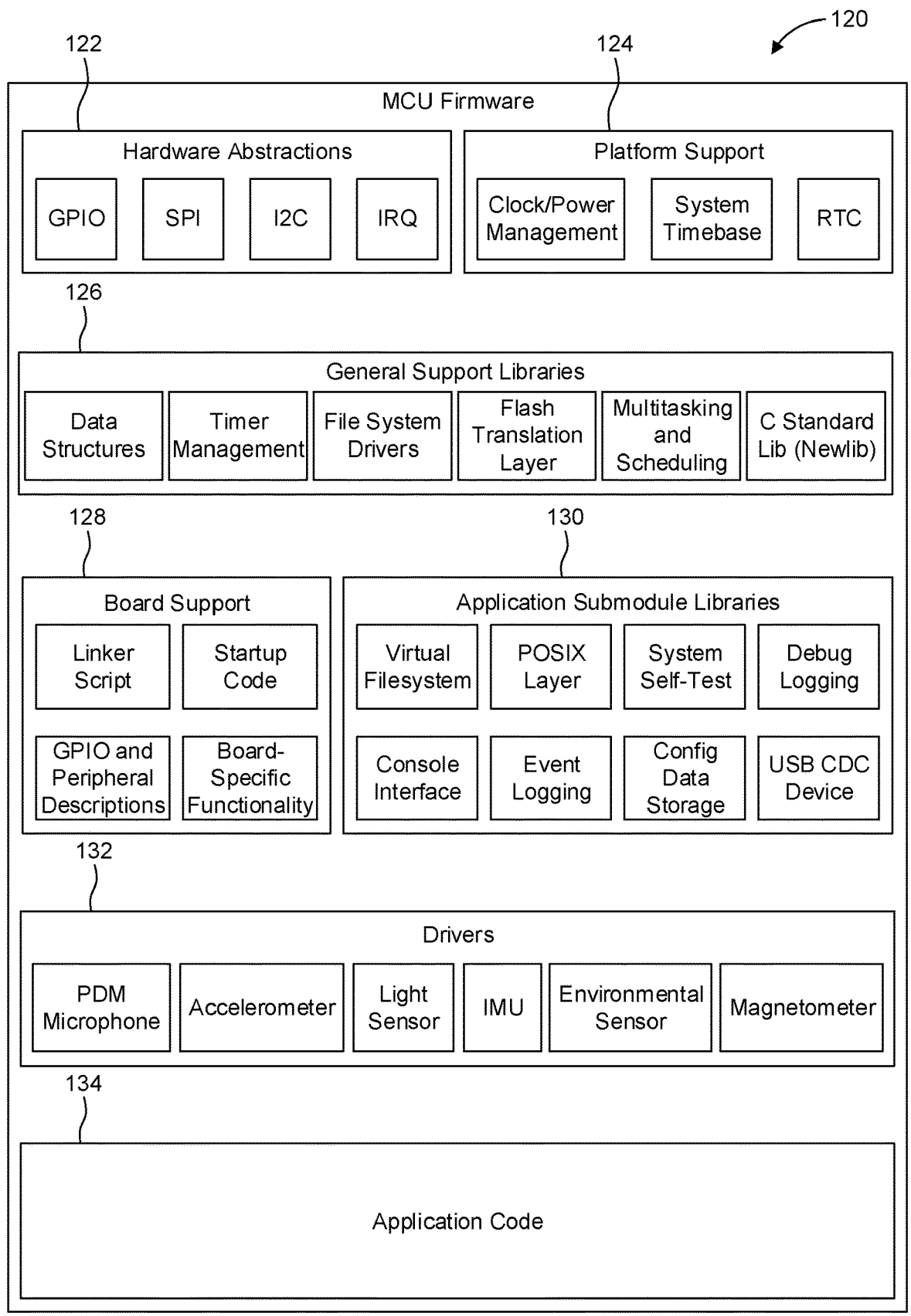
FIG. 1C illustrates exemplary firmware implemented in one or more aspects of the application.

FIG. 1C illustrates an exemplary embodiment of the employed firmware architecture 120 associated with a device. As depicted, firmware architecture 120 includes the hardware abstractions 122 include a GPIO, SPI, I2C and IRQ. The platform support 124 includes clock/power management, a system time base and RTC. Below the hardware abstractions 122 and platform support 124 is General Support Libraries 126. General Support Libraries 126 includes data structure, timer management, file system drivers, flash translation layer, multitasking and scheduling and C standard lib (newlib).

Under General Support Libraries 126 are Board Support 128 and Application Submodule Libraries 130. Board Support 128 includes linker script, startup code, GPIO and peripheral descriptions, and board-specific functionality. Application Submodule Libraries 130 include virtual file system, POSIX layer, system self-test, debug logging, console interface, event logging, config data storage, and USB communications decide class (CDC) Device.

Below Board Support 128 and Application Submodule Libraries 130 are the Drivers 132. The Drivers 132 include PDM microphone, MC3672 Accelerometer, MAX44009 Light Sensor, BMX160 IMU, BME280 Environmental Sensor and LIS3MDL Magnetometer.

Below the Drivers 132 is Application Code 134. It is envisaged the firmware architecture 120 of FIG. 1C can be employed by or in conjunction with the processor depicted in FIGS. 1A and 1B above.

According to another embodiment, the device shown in FIGS. 1A and/or 1B may be deployed as an integrated circuit (IC) or integrated module. In accordance with at least one aspect, the integrated module may include a plurality of sensor types. The sensor types may include one or more of a 3-axis gyroscope, a microphone, a pressure sensor, a 3-axis accelerometer, a humidity sensor, a temperature sensor, a light sensor, a 3-axis magnetometer, tamper detection (switch, etc), and a proximity sensor. By obtaining data from multiple sensor types in real-time or at predetermined instances, the integrated module is capable of determining its present state. The data can also be employed to optimize functionality and capability of its components.

The integrated module may also include an input/output (I/O) interface operably in communication with a processor and memory. The I/O may comprise a USB interface, a Bluetooth® module, SPI, I2C, QSPI, UART and/or an output feedback module. The processor is operable to read data from the plurality of sensor types, and the data may be obtained via the I/O interface. The processor may execute algorithms to characterize the data from the plurality of sensor types to optimize functionality, determine if repair is required and/or if a tamper event is occurring or has occurred. The algorithm may be stored and read from the memory, or any other non-transitory memory accessible by the processor.

In accordance with an aspect of the present application, the processor may receive data from one or more of the sensors to signify a change in acceleration, orientation, magnetic field around the module. In so doing, filtering false positives and accurately determining a present state of the integrated module, a repair or tamper is achieved.

Configurable Carrier System

According to one aspect of the application as exemplarily illustrated in FIGS. 2A-2D of the application, a carrier system 200 includes a main body 202 and a card connector 204 that connects to the main body 202. For example, the card connector 204 may be removably fixed to the main body 202 by fasteners 206, such as bolts.

When the card connector 204 is removably fixed to the main body 202, the card connector 204 can be removed without damaging the card connector 204, the main body 202, or the fasteners 206 that connect the card connector to the main body 202. For example, a user can remove the fasteners 206 with a tool (e.g., a screw driver) and move the card connector 204 away from the main body 202.

In an embodiment, the fasteners or another non-permanent attachment feature provide for the card connector to be removed from the main body without damaging the card connector, the main body, or the attachment feature. In some embodiments, the non-permanent attachment feature is configured to be removed by hand, without a separate tool being required.

The card connector 204 includes a first end 220 that faces the main body 202 and a second end 222 that faces away from the first end 220. For example, the first end 220 faces the main body in a first direction and the second end 222 faces in a direction that is opposite the first direction. In other embodiments, the second end does not face in a direction opposite the first direction. For example, the second end may face in a second direction that is perpendicular to the first direction.

Figure 2A:
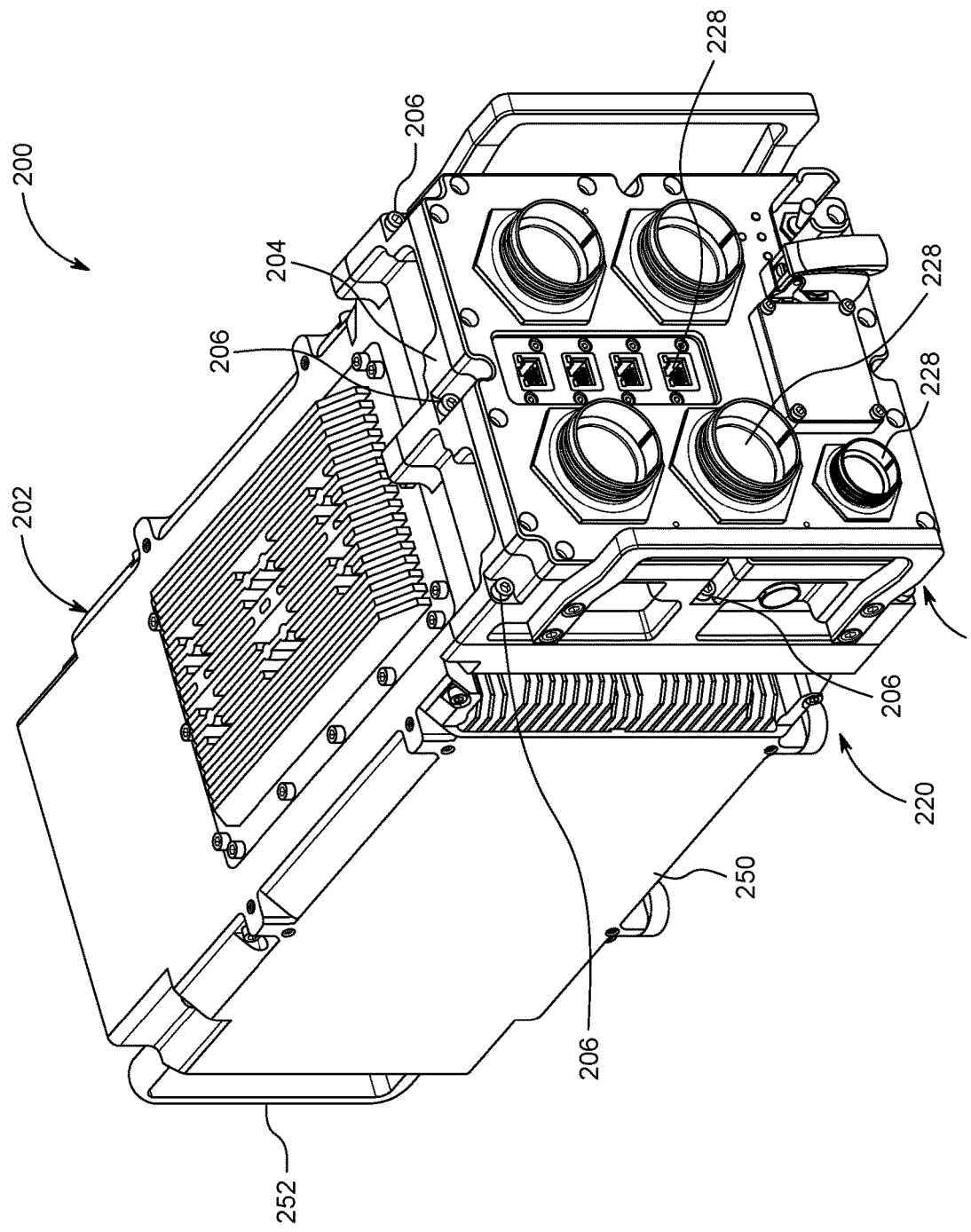
FIG. 2A illustrates a front and side oblique view of a carrier system including a card connector.
Figure 2B:
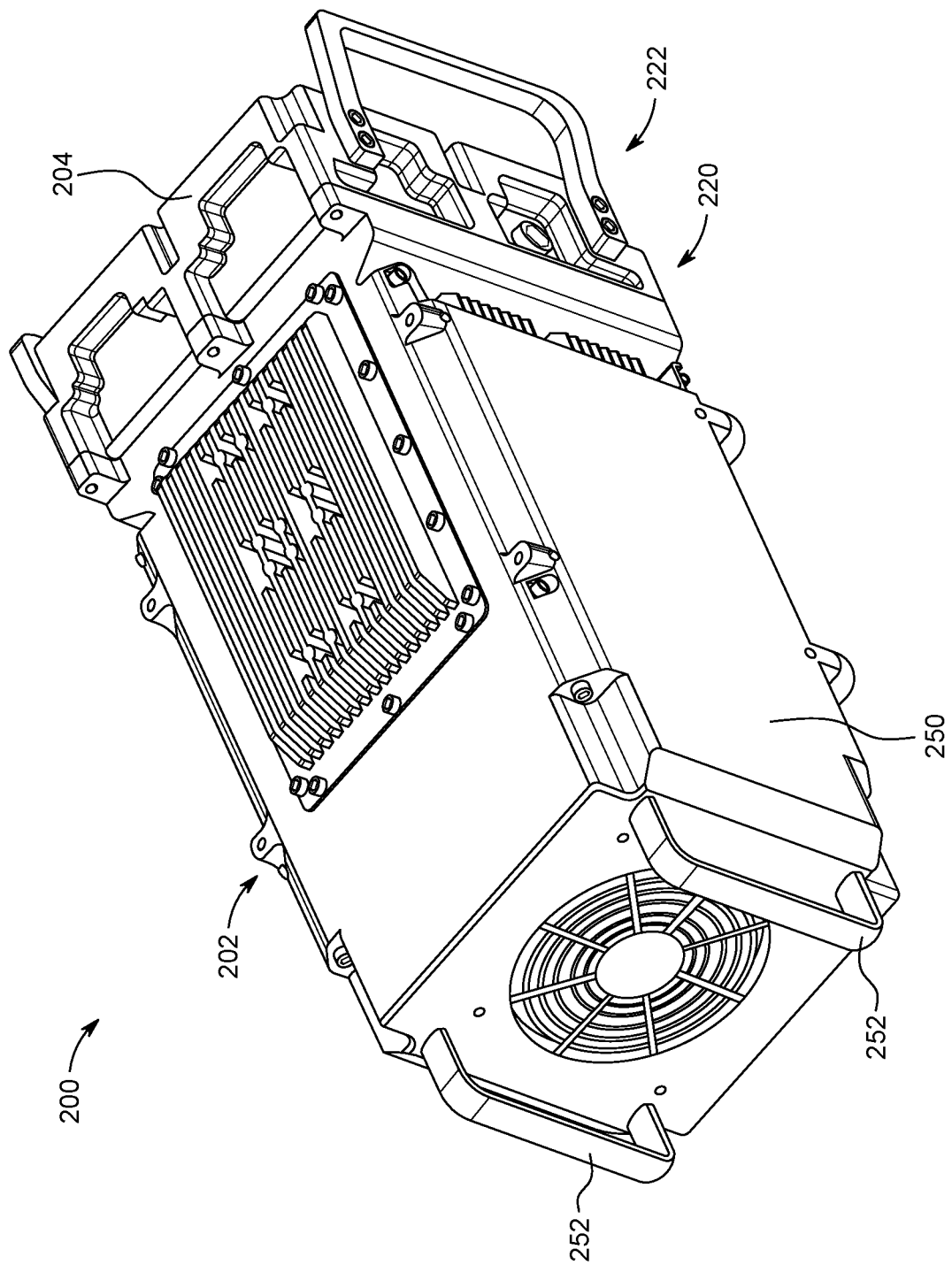
FIG. 2B illustrates a back and side oblique view of the carrier system of FIG. 2A.
Figure 2C:
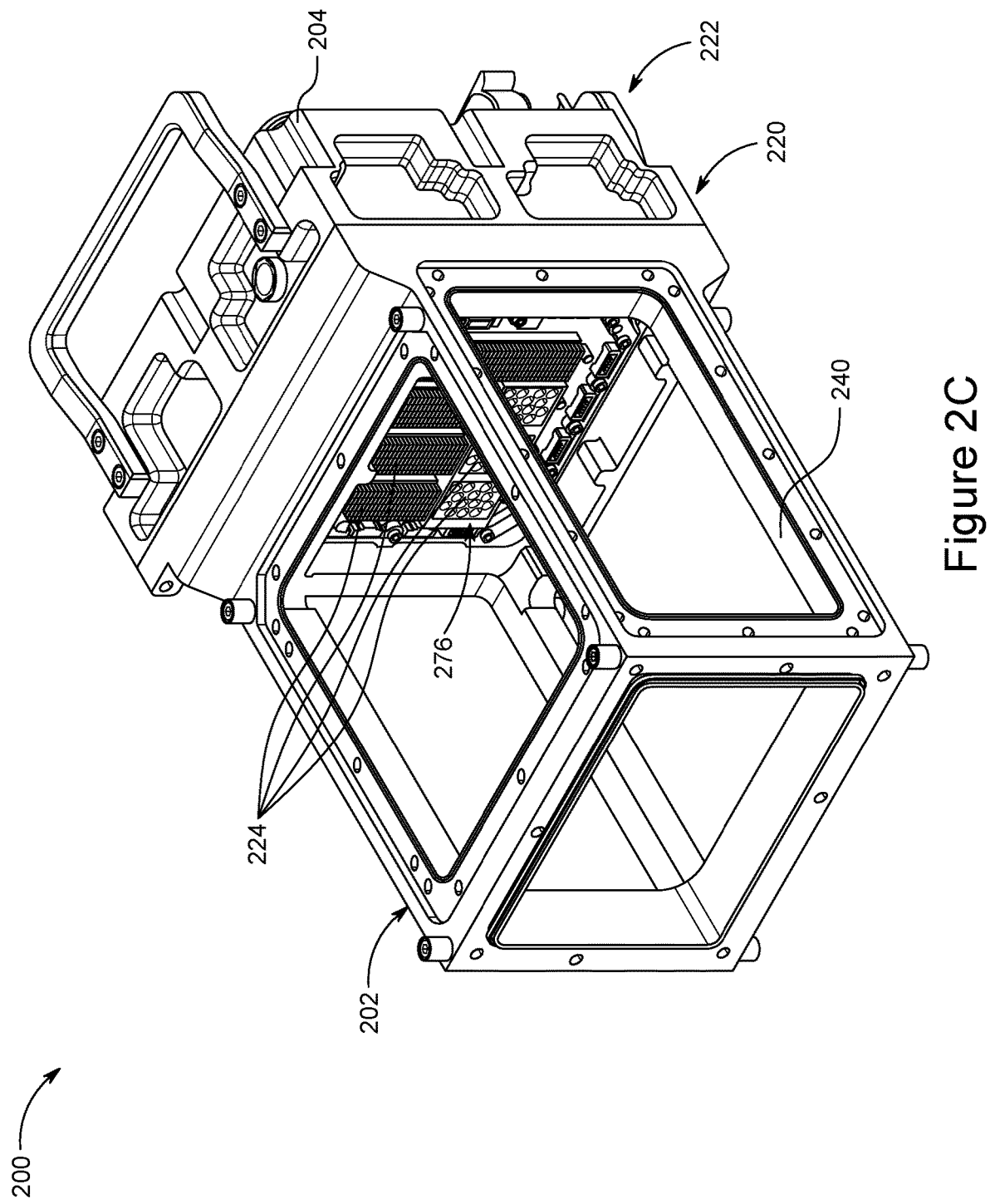
FIG. 2C illustrates a partial oblique view of the carrier system of FIG. 2A without a plugin card.

The first end 220 may include a plurality of ports 224 that are configured to electrically couple to one or more plugin cards 226 (Shown in FIG. 2D) of the carrier system 200 that are housed within the main body 202, as shown in FIG. 2C. For example, the ports 224 (e.g., each a female electrical connector with electrical connectivity) may include an opening and one or more electrically conductive elements to electrically couple to a respective one or more electrically conductive elements of the plugin cards 226 such that the ports 224 are in communication with the corresponding plugin cards 226. When electrically coupled to a respective one of the ports 224, the plugin card 226 may electronically communicate with the card connector 204, as shown in FIG. 2D.

The second end 222 may include a plurality of ports 228 that are configured to communicate with a respective one or more of the plurality of ports 224. Each of the ports 228 (shown in FIG. 2A) may be configured to receive a respective terminal connector (not shown) of a cord connected to electrical equipment (not shown) in an environment exterior of the carrier system 200 such that the ports 228 are in communication with the electrical equipment via the respective cord and terminal connector. For example, each port 228 (e.g., each a female connector with electrical or optical connectivity) may include an opening and one or more electrical or optical electrically conductive elements to couple to a corresponding terminal connector such that the respective port is in communication with the corresponding terminal connector.

For example, when the plugin card 226 is coupled to the respective port 224, one or more of the plurality of ports 228 may be in electrical communication with the plugin card 226. Electrically connecting the electrical equipment (not shown) to the one or more of the plurality of ports 228 when the plugin card 226 is coupled, may thereby place the electrical equipment in electrical communication with the plugin card 226.

Figure 2D:
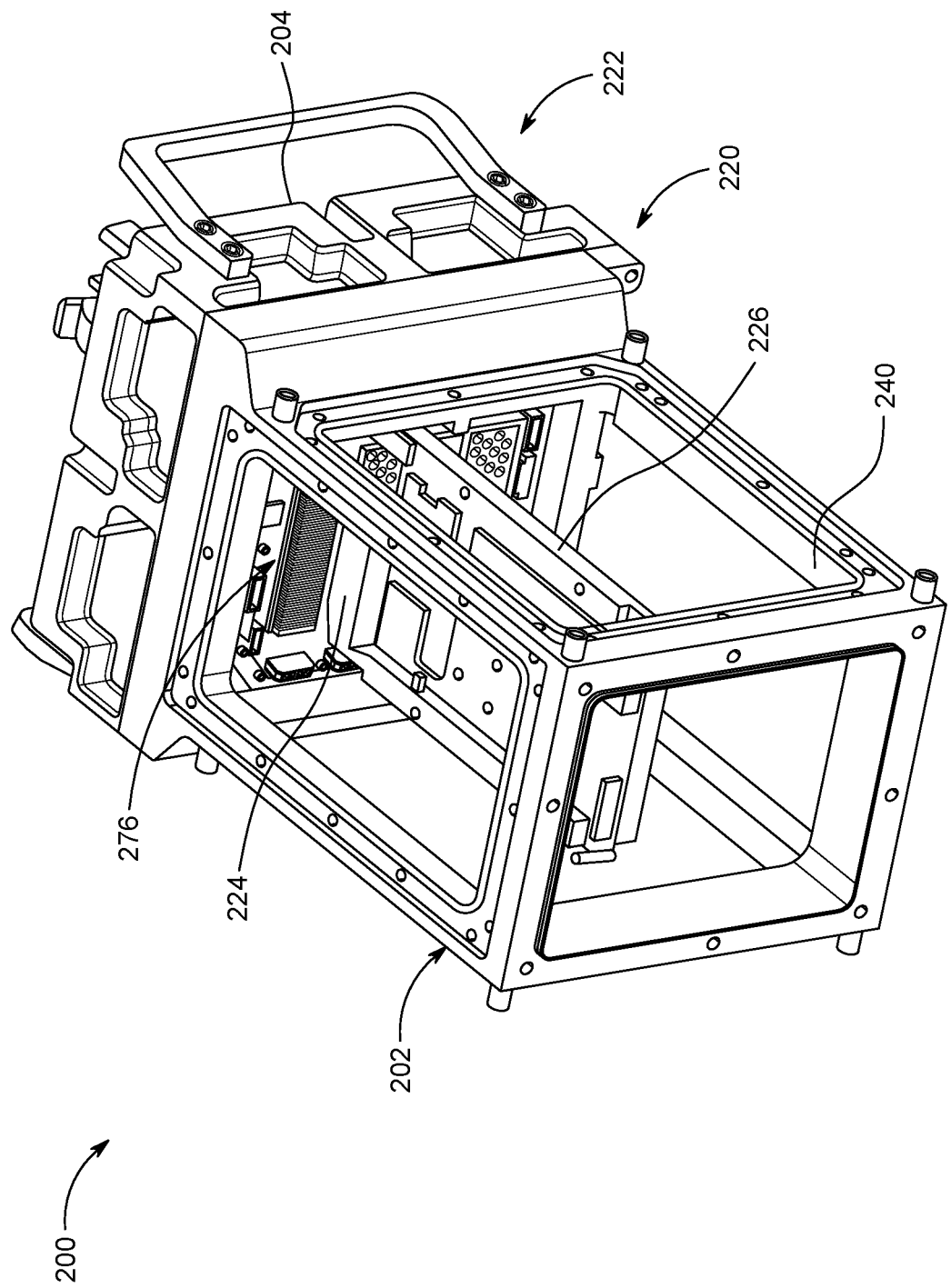
FIG. 2D illustrates another partial oblique view of the carrier system of FIG. 2A with a plugin card.

As shown in FIGS. 2C and 2D, the main body 202 may include a frame 240 that receives the fasteners 206 (FIG. 2A).

As shown in FIGS. 2A and 2B, the main body may include a shell 250 that covers the frame 240. The shell 250 may be a single body that substantially or entirely covers the frame 240. For example, the shell 250 may extend most of the length of the frame 240 to cover the majority of the length of the frame 240. The shell 250 may extend substantially the entire or the entire length of the frame 240. In some embodiments, the shell comprises multiple panels, as exemplified in FIG. 4.

The shell 250 may include one or more handles 252 that are configured to be grasped by a user. For example, a user may hold the handles 252 to pull the shell 250 from the frame 240 and/or the card connector 204 when the shell is not attached to the frame 240. In some embodiments, the shell does not include any handles.

The shell 250 may include one or more openings for venting air and/or attaching a heat transfer plate to transfer heat from the interior of the main body 202 to an exterior of the main body 202.

Turning to FIG. 2D, the plugin card 226 may be disposed entirely within the interior of the frame 240. For example, when the shell 250 covers the frame 240 as shown in FIG. 2D, the plugin card 226 may be encapsulated by the main body 202 and the card connector 204. The main body 202 and the card connector 204 may define a water tight interior space when assembled (shown in FIG. 2A), such that the plugin card 226 is protected from water outside of the interior space.

In some embodiments, the card connector includes computer systems, apparatus, and computer programs recorded on one or more computer storage devices, each configured to perform the actions of the methods. In some embodiments, the card connector includes some or all of the software, firmware, and/or hardware discussed above with respect to FIGS. 1A, 1B, and 1C. In an embodiment, the card connector includes or is configured to connect to any of the software, firmware, and/or hardware discussed above with respect to FIGS. 1A, 1B, and 1C.

The plugin card 226 may include some or all of the software, firmware, and/or hardware discussed above with respect to FIGS. 1A, 1B, and 1C.

Turning now to FIGS. 3A-K, various views of the card connector 204 are illustrated. As shown in FIGS. 3B-3D and 3F-3J, the first end 220 of the card connector 204 may include a card connecting plane 270. The card connecting plane 270 may be a VPX (e.g., Open VPX, SOSA, or CERDEC VPX) plugin card connecting plane 270. For example, the card connector plan may be VITA 65 compliant. In some embodiments, the card connecting plane may be a MicroTCA plane.

Figure 3A:
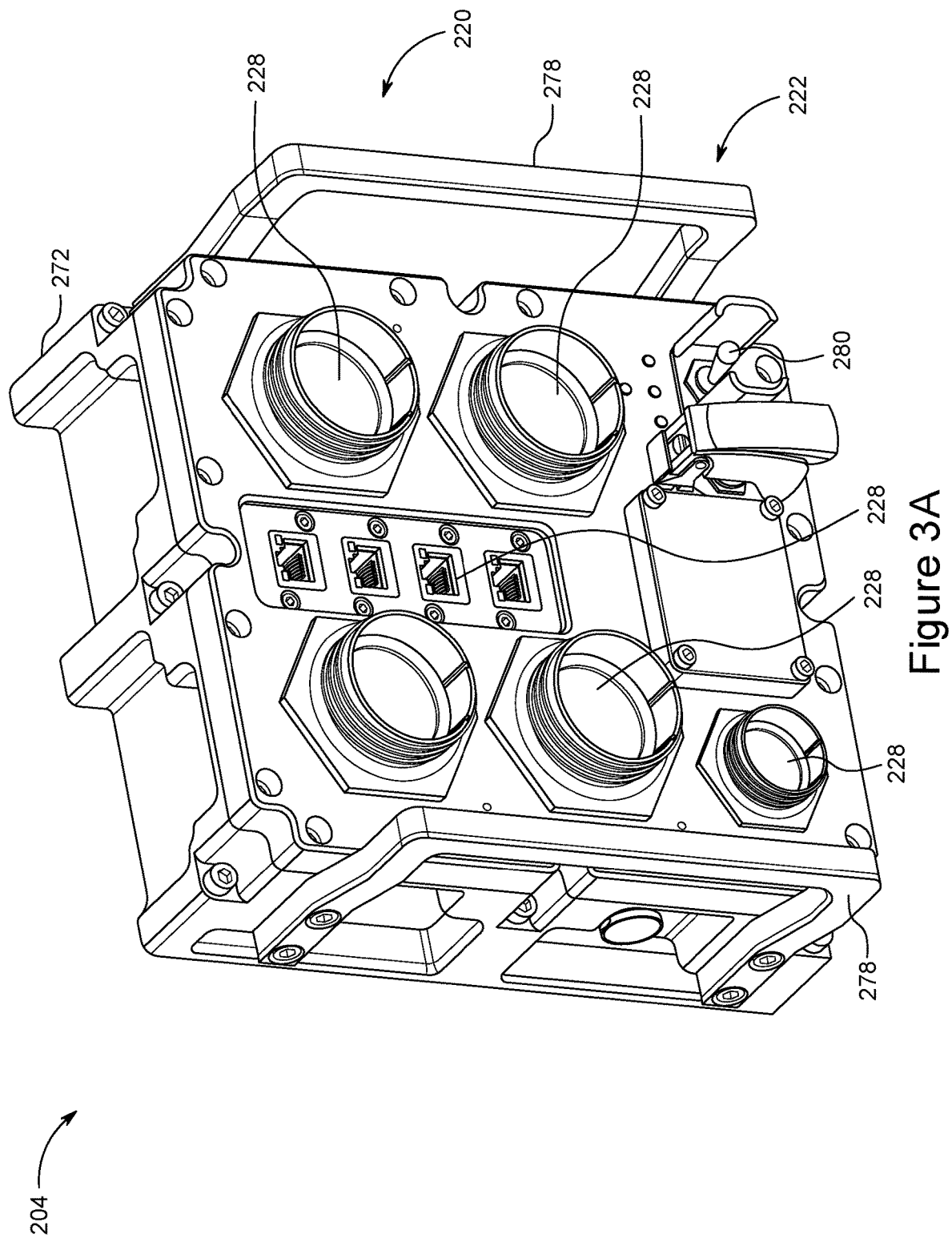
FIG. 3A illustrates a front oblique view of the card connector of FIG. 2A.
Figure 3B:
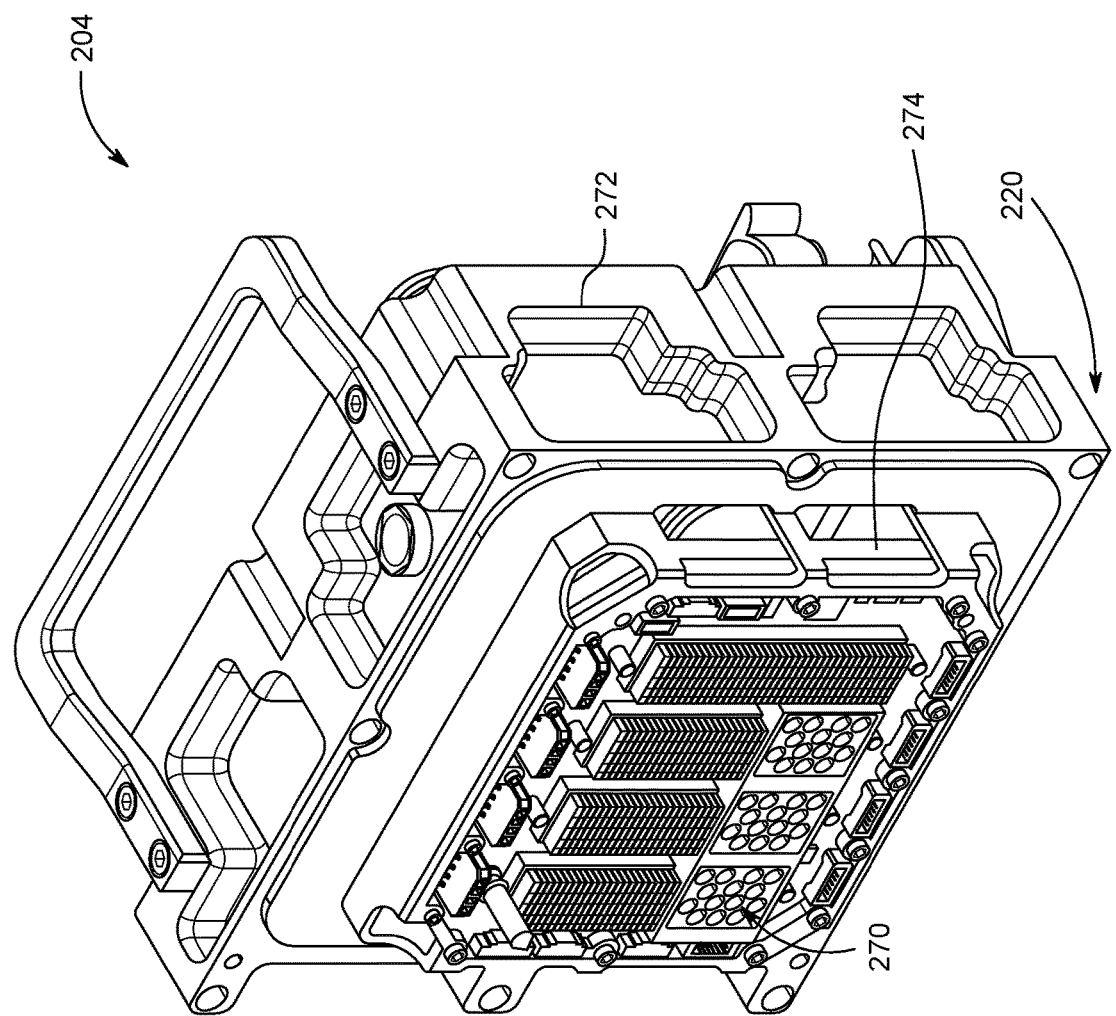
FIG. 3B illustrates a back oblique view of the card connector of FIG. 3A rotated approximately 90 degrees from 3A.
Figure 3C:
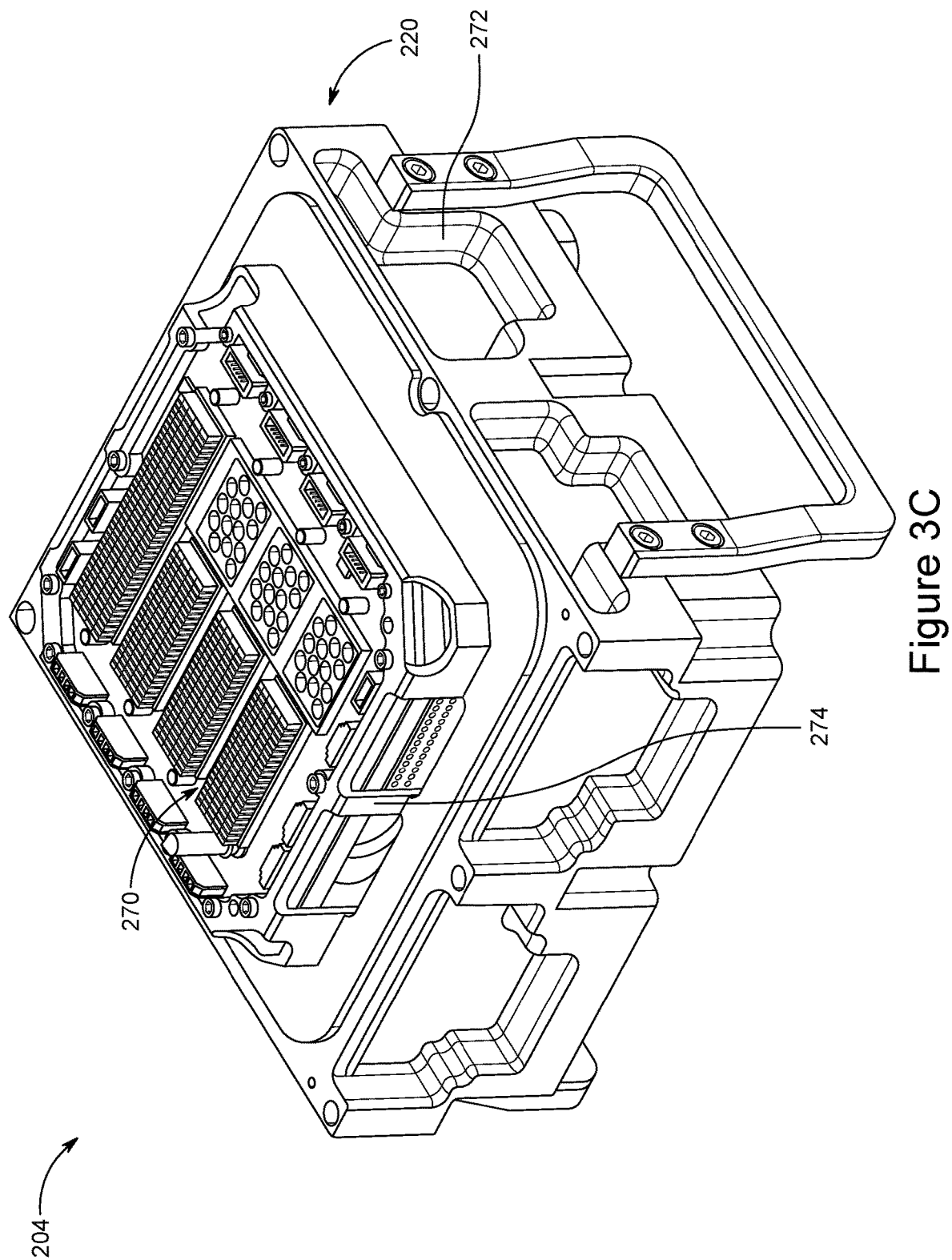
FIG. 3C illustrates another back oblique view of the card connector of FIG. 3A.
Figure 3D:
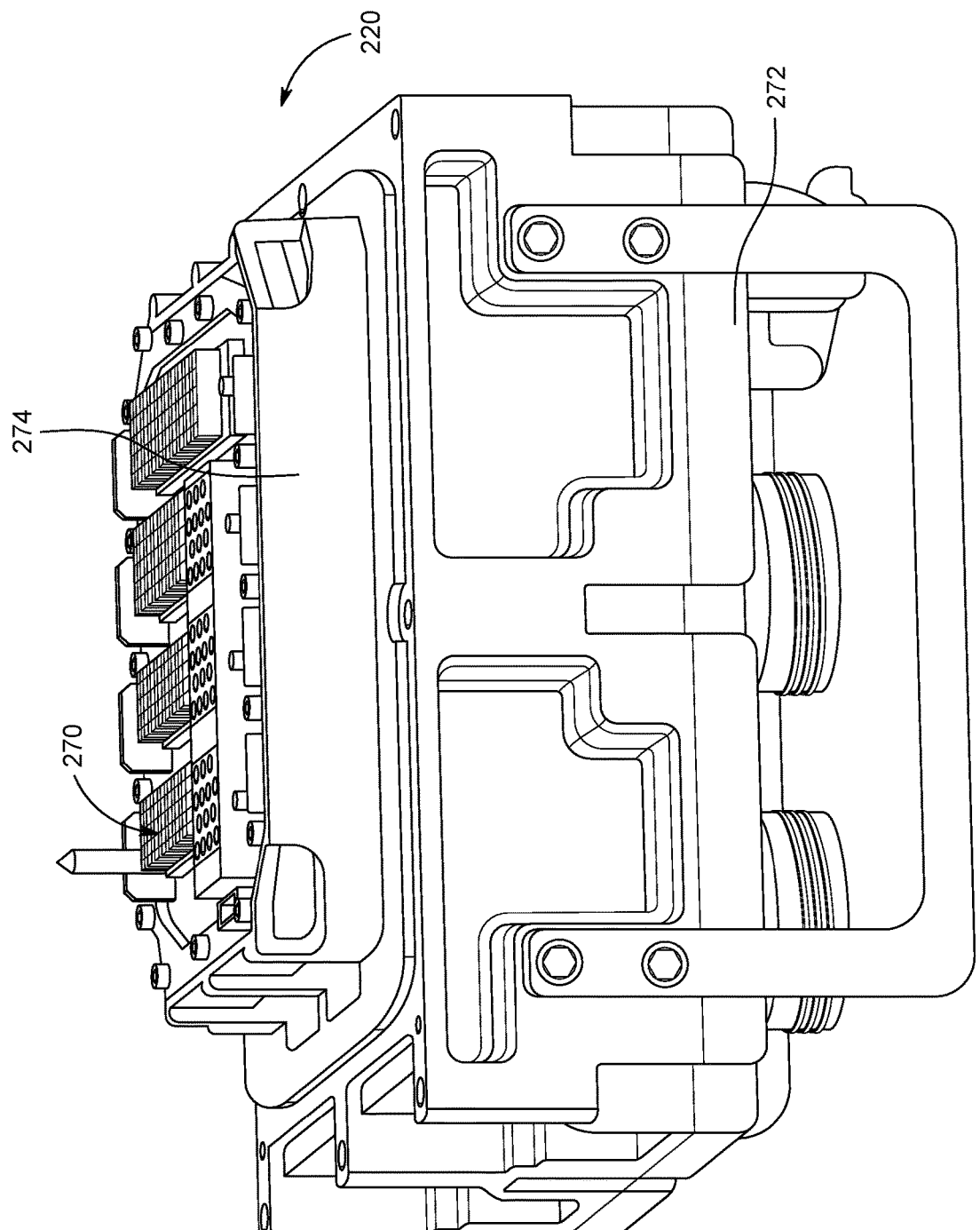
FIG. 3D illustrates a side oblique view of the card connector of FIG. 3A.

As shown in FIGS. 3B-3D, the card connector 204 includes an outer flange 272 and a protrusion 274 that includes the card connecting plane 270 and extends beyond an end of the outer flange 272 along a direction extending toward the first end 220. The protrusion 274 may be configured to be inserted into an opening 276 of the main body 202 (shown in FIGS. 2C and 2D) such that the first end 220 is at least partially defined by the protrusion 274 extends past the portion of the frame 240 that defines the opening 276 into an interior of the frame 240.

The frame 240 may be configured to support the protrusion 274, when the protrusion 274 extends through the opening 276 such that the opening receives the first end 220. For example, when the first end 220 is removably fixed to the frame 240, the entire protrusion 274 may extend along a direction away from the second end a distance that is less than a thickness, along the direction, of the portion of the frame 240 that defines the opening 276.

The protrusion 274 may have a cross-sectional profile perpendicular to the direction that is configured such that when the protrusion 274 is received in the opening 276 the outer flange 272 is aligned with the main body 202 in the direction. For example, the cross-sectional profile of the protrusion 274 may approximately match the cross-sectional profile of the opening 276. In some embodiments, outermost extents of the cross-sectional profile of the protrusion approximately match the cross-sectional profile of the opening, as exemplified in FIG. 4. In some embodiments, the card connector includes an outer protrusion that defines an outer opening to receive the main body. The outer protrusion may around the opening of the main body and outermost extents of the cross-sectional profile of the portion of the frame defining the opening may approximately match the cross-sectional profile of the outer opening of the card connector.

The thickness of the outer flange 272 along the direction may be greater than the thickness of the protrusion 274 along the direction. In some embodiments, the protrusion may be thicker than the outer flange, for example, as discussed below with reference to FIG. 4.

The outer flange 272 may extend beyond the entire protrusion in a plane perpendicular to the direction. For example, the outer flange 272 has a width and height perpendicular to the direction that are greater than a respective width and height of the entire protrusion 274 perpendicular to the direction.

The card connecting plane 270 may include the ports 224 for coupling to one or more plugin cards 226. For example, the card connecting plane 270 may be configured to couple to four plugin cards. In other embodiments, the card connecting plane is configured to couple to one or more plugin cards. For example, five or more plugin cards.

With additional reference to FIGS. 2A and 2C, when the card connector 204 is removably fixed to the main body 202 by the fasteners 206, a user can remove the fasteners 206 (e.g., with a tool such as a screwdriver and/or a nut driver). When the fasteners 206 are removed, the user may remove the card connector 204 from the main body 202. For example, the user may grasp the handles 252 and 278 to slide the protrusion 274 out of the main body 202.

The user can disconnect the plugin card 226 from the card connecting plane 270 before or after the card connector 204 is removed from the main body 202.

When the card connector 204 is removed from the main body 202, a new card connector (e.g., a card connector of the same type, or a different type with different connectors and/or ports) may be removably fixed to the main body 202. For example, the protrusion of the new card connector may be inserted into the opening 276 of the frame 240 (shown in FIG. 2C) such that the outer flange 272 aligns with the frame 240. When the outer flange is aligned with the frame, the fasteners 206 may removably fix the card connector to the frame 240. For example, the fasteners 206 may be inserted through corresponding holes in the outer flange 272 to engage with a corresponding threaded hole in the frame 240. In some embodiments, the original card connector may be again removably fixed to the main body (e.g., after maintenance is performed).

The user can couple the plugin card 226 to the card connecting plane 270 before or after the original or the new card connector 204 is removably fixed to the main body 202.

Turning to FIG. 3A, the second end 222 may include the plurality of ports 228. The ports 228 may be configured to couple to coaxial cables, wire, fiber, and/or ethernet cables (not shown) such that the ports 228 are in communication with the respective cable, wire, or fiber. In some embodiments, the ports are configured to couple to other types of cables that are configured to electronically communicate with the card connector.

The second end 222 may include one or more handles 278. For example, second end 222 may include two handles 278 attached to opposite sides of the outer flange 272. Each handle 278 may be grasped by a user's hand to remove the card connector 204 from the main body 202. Each handle 278 may be configured such that the user can to carry the entire enclosure by holding the respective handle 278. In some embodiments, the card connector includes a single handle. In some embodiments, the card connector includes more than two handles. In some embodiments, the card connector does not include any handles.

The second end 222 may include a power switch 280. In some embodiments, the power switch toggles power to plugin cards (e.g., 226 in FIG. 2D) connected to the ports 224 of the card connecting plane 270.

Figure 4:
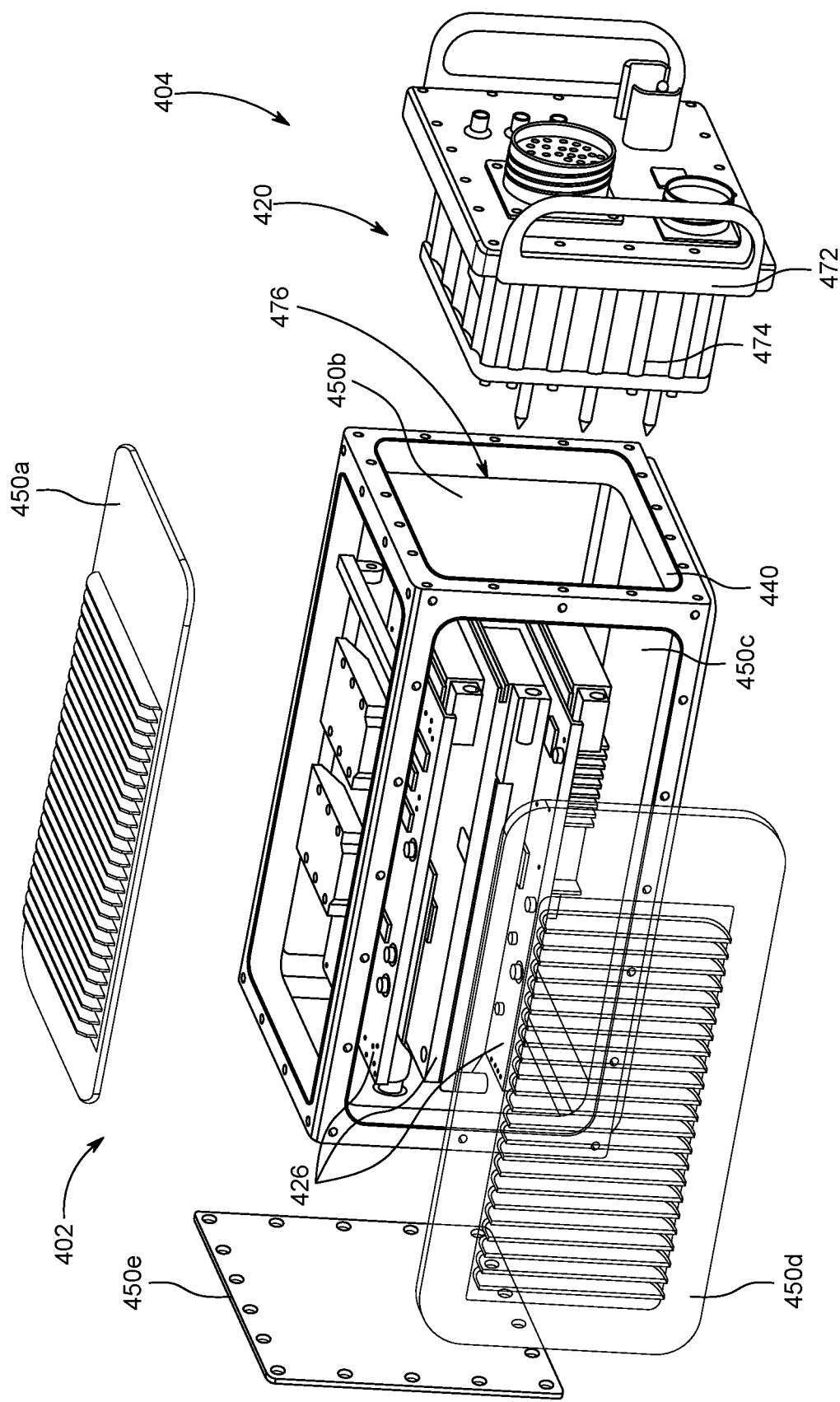
FIG. 4 illustrates an exploded oblique view of a carrier system according to another embodiment.

FIG. 4 illustrates an exploded view of another embodiment of a carrier system 400 that includes similar components as the carrier system 200 disclosed above. Accordingly, the above description of the carrier system 200 is substantially applicable to the carrier system 400, except as discussed herein.

The carrier system 400 may include a main body 402 and a card connector 404. The card connector 404 may include the same or similar connectors and/or ports as described above with respect to the card connector 204.

The card connector 404 includes an outer flange 472 and a protrusion 474 that extends beyond an end of the outer flange 472. The protrusion 474 may be configured to be inserted into an opening 476 of the main body 402 such that a first end 420 defining a card connecting plane (e.g., the card connecting plane 270 shown in FIG. 3B) is at least partially defined by the protrusion 474 and extends past the portion of the frame 440 of the main body 402 that defines the opening 476 into an interior of the frame 440. In some embodiments, the card connector includes an outer protrusion that defines an outer opening to receive the main body. The outer protrusion may extend past and around the opening of the main body.

For example, when the outer flange 472 is removably fixed to the frame 440 such that the protrusion 474 extends through the opening 476, the protrusion 474 may extend along a direction beyond the end of the outer flange 472 a distance that is greater than a thickness of the portion of the frame 440 defining the opening 476 along the direction. The protrusion 474 may extend along the direction a distance that is greater than a thickness of the outer flange 472 along the direction. In an embodiment in which the card connector includes the above discussed outer protrusion, the outer protrusion may extend along the direction from the outer flange a distance greater than the thickness of the portion of the frame defining the opening of the main body.

The protrusion 474 being configured to extend into the interior of the frame 440 provides for more weight of the card connector 404 to be distributed into the interior of the frame 440 compared to an embodiment in which the protrusion 474 does not extend into the interior of the frame 440. Distributing more weight of the card connector 404 into the interior may provide for a reduced load on the fasteners (e.g., fasteners 206 in FIG. 2A) that extend through the outer flange 472 to removably fix the card connector 404 to the frame 440. For example, distributing more weight of the protrusion 474 into the interior or less weight of the outer flange 472 external to the frame 440 may provide for reduced tendency of the weight of the outer flange 472 to urge the card connector 404 out of the opening 476.

The protrusion may provide for the plugin cards 426 to be offset from the opening 476 into the interior. Offsetting the plugin cards 426 into the interior may provide for additional space in the interior between the plugin cards 426 and the opening 476 for airflow through at least portions of the interior, which may provide for enhanced heat transfer.

Also, the main body 402 of the carrier system 400 may include a plurality of shell panels 450a, 450b, 450c, 450d, and 450e that together form a shell for the frame 440 when attached to the frame 440. One or more of the shell panels 450a, 450b, 450c, 450d, and 450e may be configured as vents to provide for air flow. In some embodiments, one or more of the shell panels are configured to as a heat transfer panel to remove heat from the interior. In some embodiments, the main body and the card connector define an interior that is water sealed from the atmosphere.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

Additionally, any of the embodiments disclosed herein can incorporate features disclosed with respect to any of the other embodiments disclosed herein. Moreover, the scope of the present disclosure is not intended to be limited to the particular embodiments described in the specification. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed is:

1. A carrier system comprising:
   a main body configured to house a plugin card;
   a card connector including
      a first end with a connector configured to electrically couple to the plugin card, wherein the first end is proximal to the main body, and
      a second end with at least one port that is configured to electrically communicate with the connector, wherein the second end is distal to the main body; and
   a handle including a proximal end attached to the card connector at an area located between the first and second ends, and including a distal end extending beyond a face of the second end, wherein the handle continuously extends from the proximal end to the distal end,
   wherein
   the first end is configured to be removed from the main body via the handle by a user when the first end is removably fixed to the main body.

2. The carrier system of claim 1, wherein the connector comprises a card connecting plane that comprises at least one port that is configured to electrically communicate with the at least one port of the second end.

3. The carrier system of claim 1, wherein the plugin card is electrically coupled to the connector of the first end.

4. The carrier system of claim 3, wherein when the first end is removably fixed to the main body, the plugin card is encapsulated by the main body and the card connector.

5. The carrier system of claim 1, wherein the plugin card includes an electrical connector configured to electrically couple to the card connector, wherein an opening in the main body receives the first end of the card connector, and wherein the electrical connector of the plugin card is spaced from the opening along a direction extending from the second end to the first end of the card connector.

6. The carrier system of claim 1, wherein the first end faces in a direction opposite the second end.

7. The carrier system of claim 1, wherein the main body includes an opening configured to receive the first end when the first end is removably fixed to the main body.

8. The carrier system of claim 7, wherein the card connector comprises:
an outer flange that at least partially defines the second end; and
a protrusion that at least partially defines the first end and extends beyond an end of the outer flange along a direction extending from the second end to the first end, wherein the protrusion has a cross-sectional profile perpendicular to the direction that is configured such that when the protrusion is received in the opening the outer flange is aligned with the main body in the direction.

9. The carrier system of claim 8, wherein the protrusion is configured to extend through the opening into an interior of the main body such that the connector of the card connector is at least partially offset from the opening in the direction.

10. The carrier system of claim 1, further comprising one or more fasteners that removably fix the first end of the card connector to the main body.

11. The carrier system of claim 1, wherein the first end includes a plurality of ports.

12. A card connector comprising:
a first end with a connector configured to electrically couple to a plugin card;
a second end with at least one port that is configured to electrically communicate with the connector; and
a handle including a proximal end attached to the card connector at an area located between the first and second ends, and including a distal end extending beyond a face of the second end, wherein the handle continuously extends from the proximal end to the distal end,
wherein the first end comprises a fastener configured to removably fix the first end to a main body in a position in which the first end faces the main body, and
whereby the first end is configured to be removed from the main body by a user via the handle when the first end is removably fixed to the main body.

13. The card connector of claim 12, wherein the connector configured to electrically couple to the plugin card includes a card connecting plane that includes at least one port that is configured to electrically communicate with the at least one port of the second end.

14. The card connector of claim 12, wherein the at least one port of the second end includes a plurality of ports that are configured to electrically communicate with the card connecting plane.

15. The card connector of claim 12, further comprising:
an outer flange that at least partially defines the second end; and
a protrusion that at least partially defines the first end and extends beyond an end of the outer flange along a direction extending from the second end to the first end, wherein the outer flange has a width and height perpendicular to the direction that are greater than a width and height of the protrusion.

16. The card connector of claim 12, wherein the card connector includes plural handles opposing one another, wherein the handles are configured to be grasped by a user's hand.

17. The card connector of claim 12, wherein the fastener includes a bolt that is configured to removably fix the first end to the main body such that the bolt is removable by a user.

18. A method of connecting a card connector to a main body of a carrier system comprising:
removably fixing a first end of the card connector proximally located to the main body, wherein the first end includes a connector configured to electrically couple to a plugin card, wherein a second end of the card connector is distally located to the main body, and wherein the second end is configured to electrically communicate with the connector; and
removing the first end of the card connector from the main body via a handle, wherein the handle includes a proximal end attached to the card connector at an area located between the first and second ends, and includes a distal end extending beyond a face of the second end, wherein the handle continuously extends from the proximal end to the distal end.

19. The method of claim 18, wherein removably fixing includes removably connecting the first end to the main body with one or more fasteners.

20. The method of claim 18, wherein the card connector is a first card connector and the method further comprises removably fixing a first end of a second card connector to the main body.

* * * * *